United States Patent [19]

Mills

[11] Patent Number: 4,564,729

[45] Date of Patent: Jan. 14, 1986

[54] TELEPHONE ILLUMINATION CIRCUIT

[75] Inventor: Kenneth R. Mills, Syracuse, N.Y.

[73] Assignee: General Electric Company, Portsmouth, Va.

[21] Appl. No.: 583,711

[22] Filed: Feb. 27, 1984

[51] Int. Cl.[4] .............................................. H04M 1/22
[52] U.S. Cl. .................................. 179/81 C; 179/90 L
[58] Field of Search ................. 179/81 C, 84 L, 90 L, 179/99 LS; 362/24

[56] References Cited

U.S. PATENT DOCUMENTS 3,784,760  1/1974  Rickert .............................. 179/90 L Primary Examiner—James L. Dwyer

[57] ABSTRACT

A telephone illumination circuit includes a light emitting means and current control means connected in series with the light emitting means across the telephone line. The current control means is adapted to maintain high AC impedance over the entire range of AC and DC operating voltage to protect the quality of AC voice signals on the telephone line.

7 Claims, 2 Drawing Figures

TELEPHONE ILLUMINATION CIRCUIT

BACKGROUND OF THE INVENTION

1. Field of the Invention

This application is directed to telephones generally and, more particularly, to illumination means for illuminating a portion of a telephone over a wide range of line conditions without degrading or attenuating voice signals on the telephone line.

2. Description of Prior Art

Illumination means have been provided in the past for illuminating portions of a telephone, such as a rotary dial or the pushbuttons of a digital keypad. It is highly desirable that such lighting arrangements be powered from the telephone line itself, which carries both a DC operating voltage and AC voltage signals representing voice inputs and outputs. It is important that the illumination circuit not degrade the quality and strength of the AC voice signals on the telephone line and that there not be excessive current drain from the telephone line at low DC operating voltages.

Light-emitting diode (LED) circuits are well known and have been employed for many purposes including illumination. These known arrangements are not, however, generally applicable to telephone illumination since they will not provide adequate protection against attenuation of the AC voice signals over a wide range of line conditions and excessive current drain under low voltage conditions.

SUMMARY OF THE INVENTION

It is a primary object of the present invention to provide an illumination circuit for a telephone which may be powered from the telephone line without unduly attenuating the AC voice signals.

Another object is to provide illumination circuit means for a telephone which may be powered from the telephone line without causing excessive current drain under low voltage conditions.

Yet another object of the invention is to provide an LED illumination circuit providing the aforesaid objects in a telephone environment.

Briefly stated, in carrying out the invention in one form, an illumination means is provided for use in a telephone circuit including a telephone line having DC and AC operating voltages thereon during operation. The illumination circuit includes a light emitting means for illuminating a portion of the telephone and current control means connected in series with the light emitting means across the telephone line. The current control means is adapted to maintain high AC impedance over the entire range of AC and DC operating voltages to protect the quality of AC voice signals on the telephone line.

By a further aspect of the invention, the current control means comprises first resistance means and means for directing substantially all of the electric current flowing through the light emitting means through the first resistance means. The directing means maintains in response to a substantially fixed DC operating voltage on the telephone line a corresponding substantially fixed voltage across the first resistance means and a corresponding substantially constant current through both the light emitting means and the first resistance means. The current control means substantially prevents the flow of current through the light emitting means whenever the DC operating voltage on the telephone is less than a predetermined minimum level to prevent the flow of excessive current under such low DC operating voltage conditions.

By a still further aspect of the invention, the current control means includes a transistor having collector, emitter, and base terminals, the collector terminal being connected to the light emitting means and the emitter terminal being connected to the first resistance means. Biasing means is connected across the transistor terminals to reverse bias the collector-base junction and forward bias the base-emitter junction. The biasing means maintains a substantially fixed voltage across the base-emitter junction and the first resistance means in response to a substantially fixed DC operating voltage on the telephone line.

By still further aspects of the invention, the light emitting means is a light emitting diode, and the biasing means comprises a second resistance means across the collector-base junction and diode means and capacitive means connected in parallel across the base-emitter junction and the first resistance means.

BRIEF DESCRIPTION OF THE DRAWING

While the novel features of the invention are set forth with particularity in the appended claims, the invention, both as to organization and content, will be better understood and appreciated, along with other objects and features thereof, from the following description taken in connection with the drawing, in which:

DESCRIPTION OF A PREFERRED EMBODIMENT

Figure 1:
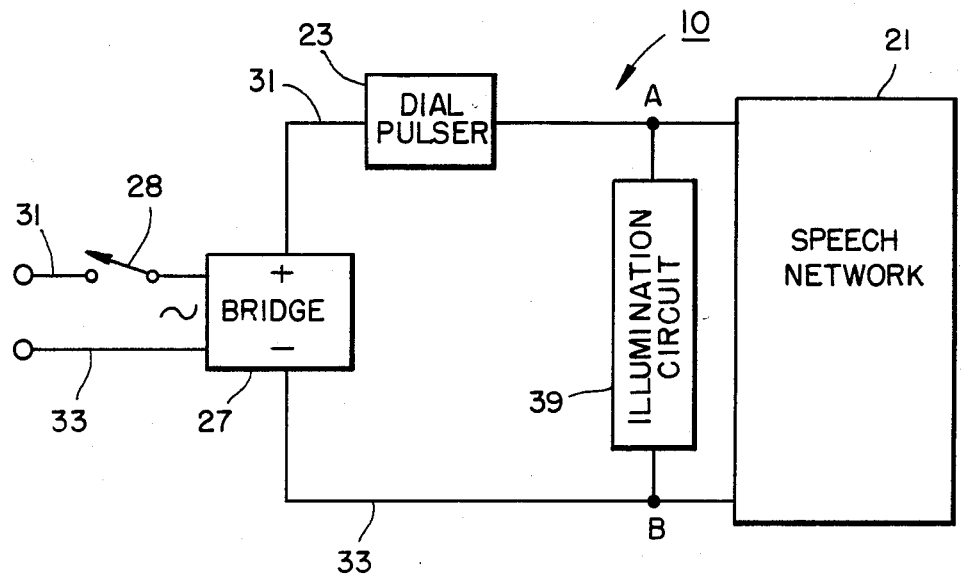
FIG. 1 is a block diagram of a telephone incorporating the illumination circuit of this invention.

FIG. 1 shows a block diagram of the electrical circuitry of a typical telephone set 10, including a conventional speech network with line matching circuitry 21, a conventional dial pulser 23, and a bridge network 27 connected through a hook switch 28 to the tip and ring lines, respectively 31 and 33 and collectively referred to herein as the telephone line. These components are conventional in the telephone art and form no part of the present invention.

Figure 2:
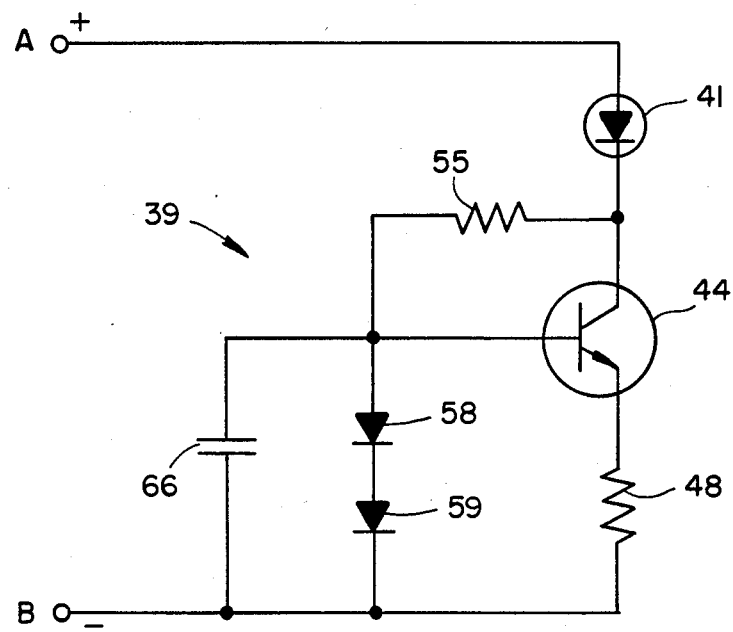
FIG. 2 is a schematic diagram of the illumination circuit of this invention.

In accordance with the present invention, an illumination circuit 39 shown by FIGS. 1 and 2 is electrically attached across terminals A and B. The conventional bridge network 27 is provided to assure during telephone operation that the telephone set 10 is provided with DC voltage having the polarity indicated in FIGS. 1 and 2.

In a conventional telephone, the DC voltage across terminals A and B may typically vary in normal operation between three and fifteen volts when the hook switch 28 is closed, the actual voltage depending on various factors such as central office voltage, the distance of the telephone from the central office, and the number of parallel telephones off hook, i.e. with their hook switches 28 closed. These factors are substantially fixed in any given situation, and the telephone may be viewed as operating under a given fixed DC voltage condition. The fixed voltage may, of course, change if the line conditions change, e.g., a parallel telephone is taken off hook. The illumination circuit 39 of this invention is capable of operating over a wide range of these DC voltage conditions without attenuating or degrading the AC voice signals existing on the telephone line and at terminals A and B and without causing excessive current drain at DC voltages below the normal operating range.

As shown by FIG. 2, the illumination circuit 39 includes an LED 41 having its anode connected to terminal A and its cathode connected to the collector of a transistor 44. The LED 41 can be used, for example, to light the rotary dial or pushbuttons of the telephone set 10. A first resistor 48 of relatively low resistance, e.g. 27 ohms, is coupled between the emitter of the transistor 44 and terminal B. A second resistor 55 having high resistance, e.g. 47 K ohms, is connected across the collector-base junction of the transistor 44. Two diodes 58 and 59 connected with the illustrated polarity are provided between the base of the transistor 44 and the terminal B. During normal operation (i.e., when the DC voltage across the terminals A and B is substantially fixed within an approximate range of three to fifteen volts), the two diodes 58 and 59 in combination with a capacitor 66 provide a corresponding fixed voltage drop across the base-emitter junction and the resistor 48.

The capacitor 66 in parallel with the diodes 58 and 59 smooths out any voltage fluctuations or ripple that would otherwise occur at the base of transistor 44 as a result of AC voice signals superimposed on the substantially fixed DC voltage across terminals A and B. The diodes 58 and 59 and the capacitor 66 thus provide a corresponding fixed voltage drop (in the range of 0.75 to 1.0 volts) across not only the diodes, but also the base-emitter junction of the transistor 44 and the resistor 48. The actual value of the fixed voltage across the diodes 58 and 59 is related to the substantially fixed DC voltage on the telephone line and the point at which the diodes 58 and 59 are operating on their characteristic curves. Thus, when the DC line voltage is extremely high, the diodes 58 and 59 may be fully turned on, resulting in a voltage drop of approximately 1.0 volt across the diodes. Alternatively, at relatively low DC line voltages, the voltage drop across the diodes may be on the order of 0.75 volt or less. For a given DC line voltage, the point at which the diodes 58 and 59 operate on their characteristic curves will vary in accordance with the relative value of the resistor 55. If the resistance of the resistor 55 is reduced, the diodes will turn on fully at a correspondingly lower voltage, and substantially constant current will flow through the LED 41 at all voltages above the line voltage at which the diodes turn on fully.

During normal telephone operation with the DC line voltage across terminals A and B fixed within the range of three to fifteen volts, the base-collector junction of the transistor 44 is reversed biased and the base-emitter junction of the transistor 44 is forward biased such that the transistor 44 operates in its active region. Under these conditions, the voltage drop across the base-emitter junction is fixed at approximately 0.7 volts. Since the voltage drop across the diodes 58 and 59 is fixed at a voltage within the approximate range of 0.75 to 1.0 volts, a corresponding fixed voltage in the range of 0.05 to 0.3 volts exists across the resistor 48 (voltage drop across diodes less the voltage drop across the base-emitter junction). As a result, a corresponding fixed current flows through the resistor 48 for a given line voltage, provided for the reasons discussed below that the DC voltage across terminals A and B is at least two volts. Since the resistor 55 draws very little current, virtually all current flowing through the LED 41 flows through the resistor 48. The constant current flowing through the resistor 48 at a given DC line voltage thus assures that constant current also flows through the LED 41. Since the voltage drop across the diodes 58 and 59 is held constant by the capacitor 66 in the presence of AC voice signals on the telephone line, high AC impedance is assured during normal operation (current through the LED does not vary with variations in the AC voice signals), and the AC voice signals on the telephone line are therefore not attenuated.

When the DC voltage across terminals A and B drops below three volts, the transistor 44 starts to turn-off; at approximately two volts, the transistor 44 is turned off completely, and no current flows through the LED 41. The illumination provided by the LED 41 is thus reduced or eliminated when the DC voltage on the telephone line drops below the normal operating range, i.e. less than three volts. This arrangement assures that the high AC impedance is maintained at low DC voltages and that excessive current is not drawn through the LED 41 at low DC voltages.

By having the resistor 55 connected between the cathode of the LED and the base of the transistor 44, the transistor 44 is prevented from going into saturation at low DC voltages. The transistor 44 passes from operation in its active region directly to operation in cut-off. This result is a major aspect of the present invention since operation in saturation at low DC voltages would permit the voltage across the resistor 48 to vary with changes in AC voltages on the telephone line. Under such conditions, the illumination circuit would no longer have high AC impedance. Moreover, operation of the transistor 44 in saturation would permit excessive current drain at certain low DC voltages.

In a practical embodiment of this invention, the resistor 48 has a value of approximately 27 ohms. As a result of the fixed voltage drop (within the range of 0.05 to 0.3 volts) across the resistor 48 during normal operation, the fixed current flowing through the LED 41 is held within the approximate range of 2.0 ma. to 11.0 ma. This level of current is generally acceptable since the normal current drain of a telephone set is typically in the broad range of 26 to 100 ma. When the line voltage drops below three volts, the current flowing through the LED 41 is reduced still further, and the current flowing through the LED is totally eliminated at low DC voltages in the manner described above.

From the foregoing, it will be seen that telephone illumination circuit of this invention may be powered from the telephone line without unduly attenuating or degrading the AC voice signals on the telephone line. It maintains high AC impedance at all voltages, and it prevents excessive current drain at low DC voltages.

While the invention has been particularly shown and described with reference to a preferred embodiment of the invention, it will be understood by those skilled in the art that various changes in form, details and application may be made without departing from the spirit and scope of the invention. For example, a zener diode could be used instead of the diodes 58 and 59 to help establish the fixed voltage across the resistor 48. Also, the transistor 44 is an NPN transistor, but it will be understood that a PNP transistor or equivalent device could be used instead of the NPN transistor. Although illustrated in connection with a dial pulser system, the illumination circuit may be used with equal utility in a tone-dialing system. Other modifications will readily occur to those having skill in the art. Accordingly, it is intended that all such modifications and changes be included within the scope of the appended claims.

What is claimed as new and is desired to secure by Letters Patent is:

1. In a telephone circuit including a telephone line having DC and AC operating voltages, including voice signals, thereon during telephone operation, an illumination circuit comprising:
    a light emitting means for illuminating a portion of the telephone, and
    current control means connected in series with said light emitting means across the telephone line, said current control means adapted to maintain high AC impedance over the entire range of AC and DC operating voltages to protect the quality of AC voice signals on the telephone line.

2. A telephone illumination circuit as defined by claim 1 in which said current control means comprises first resistance means and means for directing substantially all of the electric current flowing through said light emitting means through said first resistance means, said directing means maintaining in response to a substantially fixed DC operating voltage on the telephone line a corresponding substantially fixed voltage across said first resistance means and a corresponding substantially constant current through said light emitting means and said first resistance means.

3. A telephone illuminating circuit as defined by claim 1 in which said current control means is adapted to substantially prevent the flow of current through said light emitting means whenever the DC operating voltage on the telephone line is less than a predetermined minimum level, whereby excessive current flow is prevented under such low DC operating voltage conditions.

4. A telephone illumination circuit as defined by claim 1 in which said current control means comprises:
    a first resistance means,
    a transistor having collector, emitter, and base terminals, said collector terminal connected to said light emitting means and said emitter terminal connected to said first resistance means, and
    biasing means across said transistor terminals to reverse-bias the collector-base junction, forward bias said base-emitter junction, and maintain in response to a substantially fixed DC operating voltage on the telephone line a corresponding fixed voltage across said base emitter junction and said first resistance means.

5. A telephone illumination circuit as defined by claim 4 in which said light emitting means is a light emitting diode.

6. A telephone illumination circuit as defined by claim 4 in which said biasing means comprises a second resistance means across said collector-base junction and diode means and capacitive means connected in parallel across said base-emitter junction and said first resistance means.

7. A telephone illuminating circuit as defined by claim 4 in which said current control means is adapted to substantially prevent the flow of current through said light emitting means whenever the DC operating voltage on the telephone line is less than a predetermined minimum level, whereby excessive current flow is prevented under such low DC operating voltage conditions.

* * * * *